United States Patent

[11] 3,578,261

[72] Inventors Kozo Yamamoto
Hirakata-shi;
Toshio Kawada, Neyagawa-shi, Japan

[21] Appl. No. 708,312
[22] Filed Feb. 26, 1968
[45] Patented May 11, 1971

[73] Assignee Matsushita Electric Industrial Co., Ltd., Osaka, Japan

[54] TAPE RECORDER OF MAGAZINE TYPE
16 Claims, 33 Drawing Figs.

[52] U.S. Cl. .......... 242/199, 274/4
[51] Int. Cl. .......... G11b 23/10
[50] Field of Search .......... 242/55.13, 199, 200, 198, 197; 274/4, 11; 179/100.22

[56] References Cited

UNITED STATES PATENTS

| | | | |
|---|---|---|---|
| 3,475,031 | 10/1969 | Kuehnlein | 274/4(C) |
| 3,385,534 | 5/1968 | Staar | 242/55.13 |
| 3,429,519 | 2/1969 | Staar | 242/55.13 |

*Primary Examiner*—George F. Mautz
*Attorney*—Stevens, Davis, Miller & Mosher

ABSTRACT: A tape recorder of the magazine type adapted to operate with a magazine of the kind in which a magnetic tape supplied from one reel is taken up on the other. In the tape recorder, the reel shafts and the capstan are mounted on a movable body which is pivotally and linearly movable in response to the insertion of the magazine into the recorder casing whereby the reel shafts and capstan are brought into driving engagement with the corresponding elements in the magazine.

Patented May 11, 1971 3,578,261

11 Sheets-Sheet 1

INVENTORS
KOZO YAMAMOTO,
TOSHIO KAWADA,

BY Stevens, Davis, Miller & Mosher

ATTORNEYS

INVENTORS
KOZO YAMAMOTO
TOSHIO KAWADA

BY Stevens, Davis, Miller & Mosher

ATTORNEYS

Patented May 11, 1971 3,578,261

11 Sheets-Sheet 3

INVENTORS
KOZO YAMAMOTO,
TOSHIO KAWADA

BY Stevens, Davis, Miller & Mosher

ATTORNEYS

INVENTORS
KOZO YAMAMOTO,
TOSHIO KAWADA,

BY

ATTORNEYS

INVENTORS
KOZO YAMAMOTO,
TOSHIO KAWADA,

BY

ATTORNEYS

INVENTORS
KOZO YAMAMOTO
TOSHIO KAWADA

BY Stevens, Davis, Miller & Mosher

ATTORNEYS

INVENTORS
KOZO YAMOMOTO,
TOSHIO KAWADA

BY

ATTORNEYS

INVENTORS
KOZO YAMAMOTO,
TOSHIO KAWADA

BY Stevens, Davis, Miller & Mosher

ATTORNEYS

INVENTORS
KOZO YAMOMOTO,
TOSHIO KAWADA,

BY Stevens, Davis, Miller & Mosher

ATTORNEYS

INVENTORS
KOZO YAMAMOTO,
TOSHIO KAWADA,

BY [signature]

ATTORNEYS

INVENTORS
KOZO YAMAMOTO,
TOSHIO KAWADA,

BY Stevens, Davis, Miller & Mosher
ATTORNEYS

TAPE RECORDER OF MAGAZINE TYPE

BACKGROUND OF THE INVENTION

This invention relates to a magnetic recording and reproducing apparatus using a tape encased in a magazine, and more particularly to a magazine mounting and dismounting mechanism in a tape recorder of the magazine type operable with a magazine in which a magnetic tape is adapted to travel between reels to be taken up on either reel.

In heretofore known tape recorders of the magazine type, the magazine was first inserted at a position substantially above the predetermined position relative to drive means, and after ensuring the complete alignment between reel shafts and shaft receiving holes in the hubs of the reels as well as between a capstan and a capstan receiving hole of the magazine, the magazine was urged downwardly to achieve the desired engagement between the drive means of the tape recorder and the driven elements in the magazine. Accordingly, close attention had to be paid to achieve accurate positioning of the magazine in the tape recorder and inconvenience was thus encountered during mounting of the magazine in the tape recorder. Further, according to the prior art tape recorder structure, after the driven elements in the magazine were so engaged with the reel shafts and the capstan, a movable body carrying thereon a pinch roller and a magnetic head had to be moved toward a main body having the reel shafts and the capstan in parallel relation with the latter in order to establish the recording or reproducing condition. Due to such a structure, a retaining mechanism was required which can firmly retain the movable body relative to the main body against any dislodging movement of the former after the movable body was urged to move to the position by a sufficiently large force which overcomes the pressure exerted by the pinch roller. The retaining force to retain the movable body in position was quite large, or amounted to a value of, for example, about 2.5 kilograms.

SUMMARY OF THE INVENTION

The present invention contemplates the provision of a tape recorder of the magazine type having an entirely novel mechanism by virtue of which prior defects as described above can completely be eliminated and which comprises means operative in response to the insertion of a magazine into the casing of the tape recorder to cause an upward movement of the magazine drive members thereby establishing the driving engagement between the magazine and the magazine drive members, and means for causing a downward movement of the drive members thereby causing the ejection of the magazine outwardly of the tape recorder casing.

It is an important object of the present invention to provide a tape recorder of the magazine type adapted to operate with a magazine of the kind equipped with two rotatable hubs for the supply and takeup of a magnetic tape enclosed therein, having a movable body provided with means for driving said tape in said magazine and movable between two extreme positions in response to the insertion and withdrawal of said magazine into and out of said tape recorder, and a stationary casing movably supporting said movable body therein, said movable body carrying thereon a drive motor, a capstan mounted in coaxial relation with a flywheel which is driven from said drive motor so as to drive said tape in said magazine, and reel shafts for causing rotation of said two hubs in said magazine, said casing carrying therein a magnetic head engageable with said tape in said magazine and a pinch roller for holding said tape between it and said capstan on said movable body so as to drive said tape in cooperation with said capstan; said tape recorder comprising means for pivotally and linearly movably supporting one end, which is remote from the side carrying said reel shafts, of said movable body in one end of said casing so that said movable body can make a linear movement at said one end in the moving direction of said magazine while making a pivotal movement about said one end, and means operative in response to the insertion of said magazine through a magazine insertion opening to cause said reel shaft side of said movable body to move toward the major face of said magazine as said magazine is progressively inserted thereby establishing a driving engagement between said reel shafts and said capstan on said movable body and the corresponding elements in said magazine.

The above and other objects, advantages and features of the present invention will become apparent from the following description with reference to the accompanying drawings.

DESCRIPTION OF THE PREFERRED EMBODIMENTS

Figure 1:
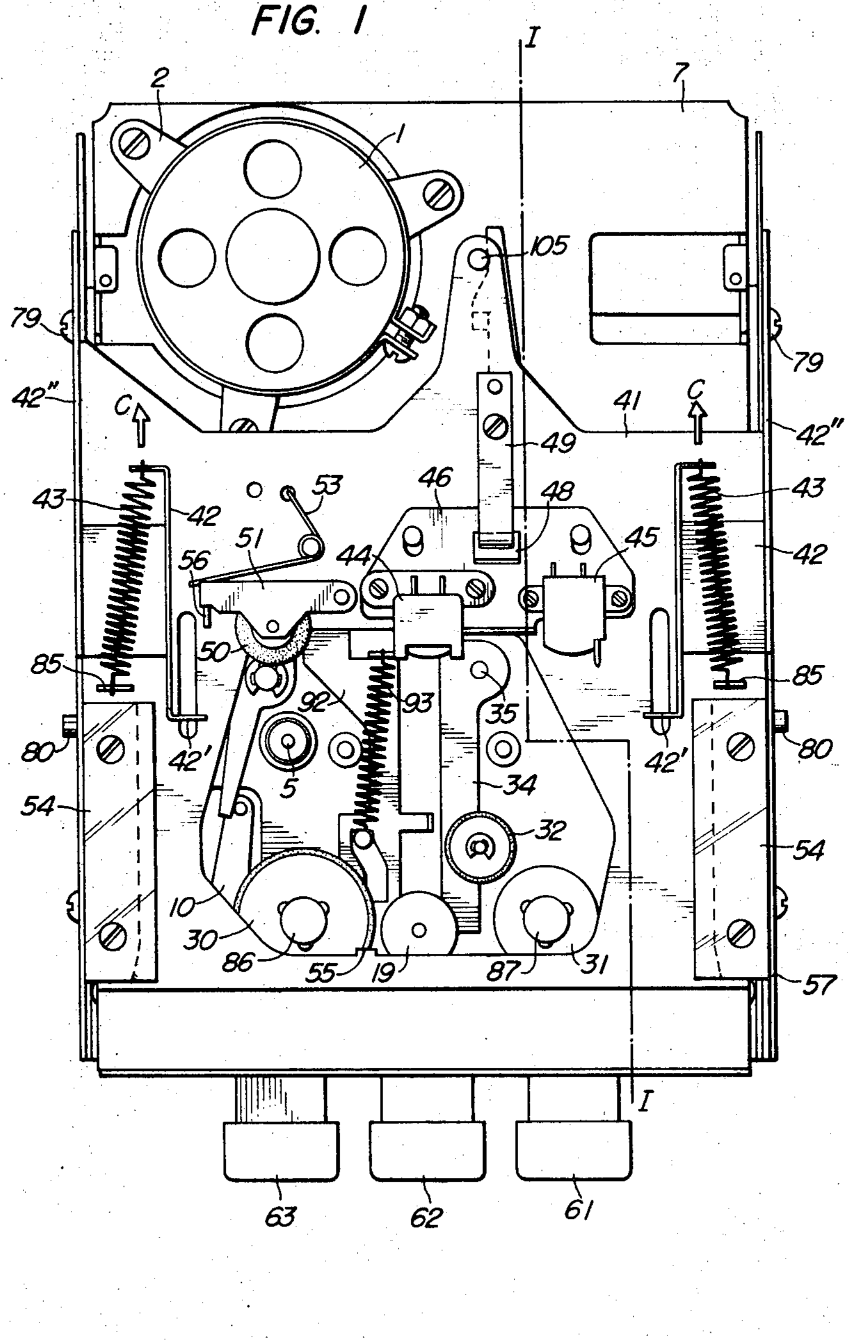
FIG. 1 is a plan view of the apparatus according to the present invention, the apparatus being shown in its nonoperative state.
Figure 2:
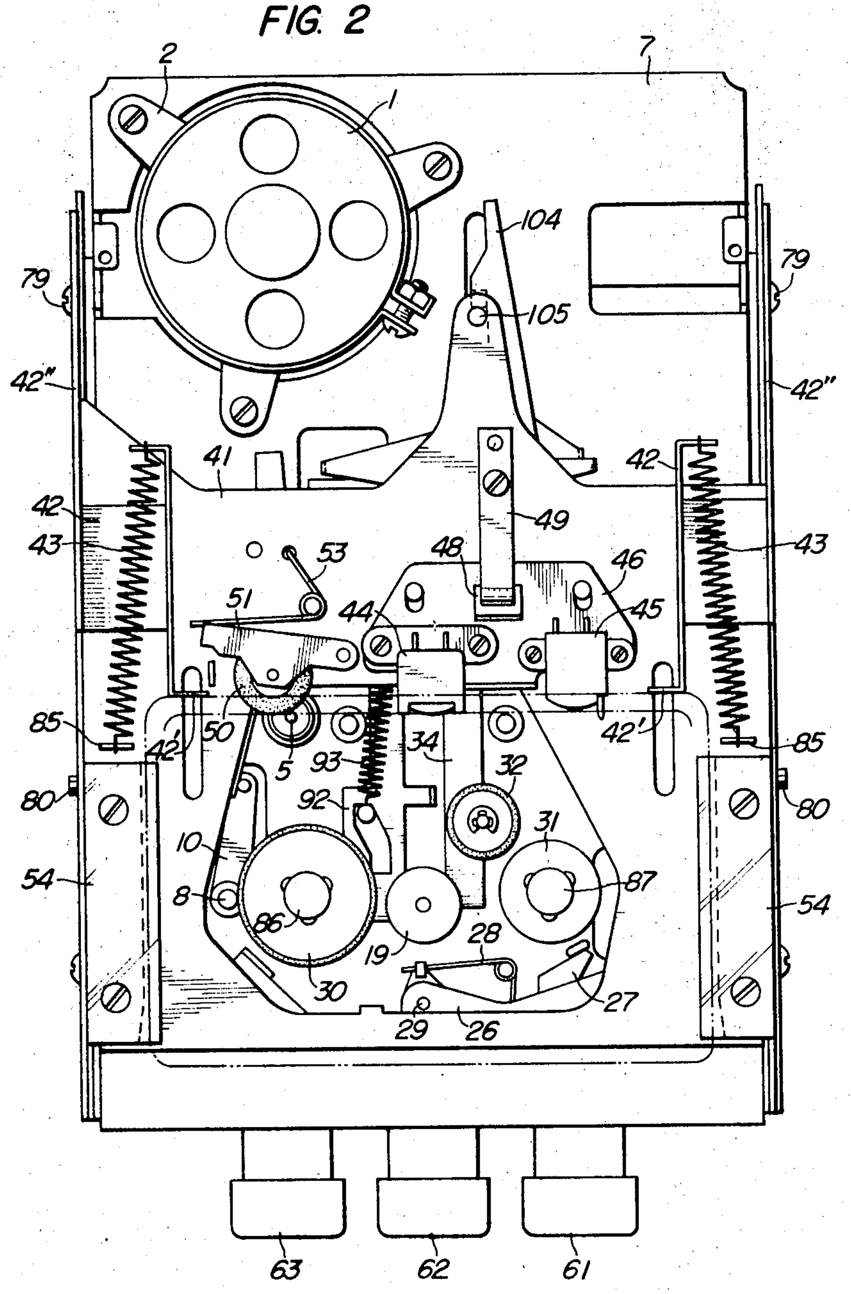
FIG. 2 is a view similar to FIG. 1, but showing the apparatus in its operating state with a magazine inserted and a movable body in the apparatus urged to its operative position.
Figure 3:
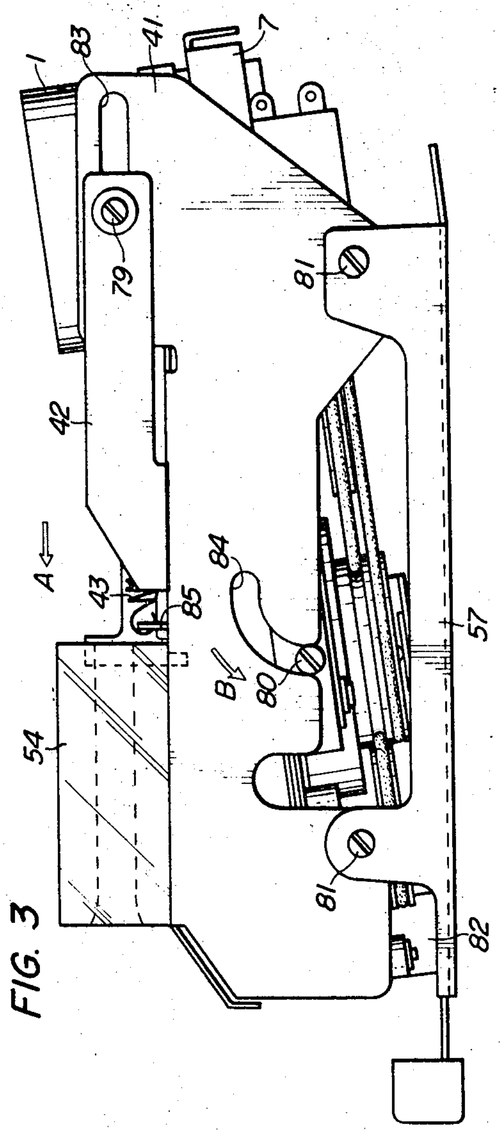
FIG. 3 is a side elevational view of the apparatus shown in FIG. 1.
Figure 4:
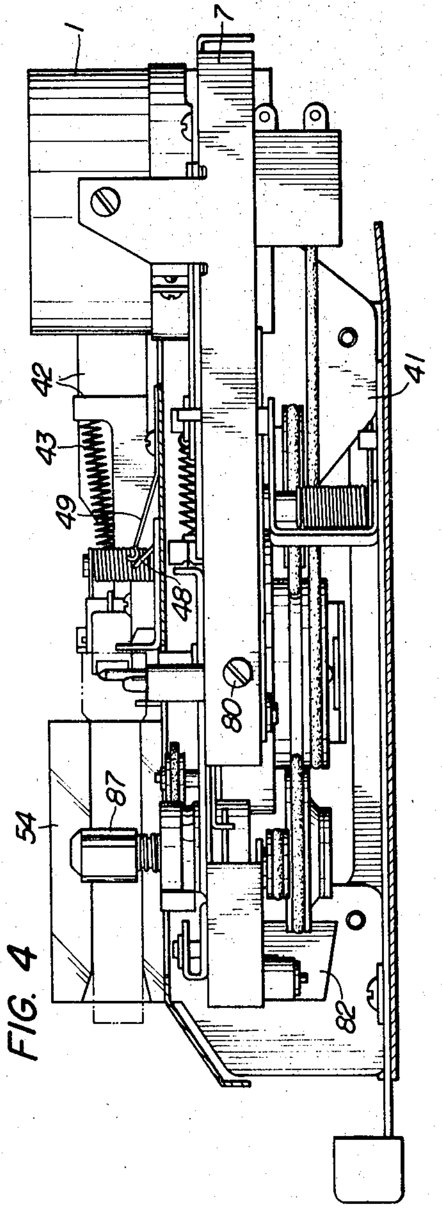
FIG. 4 is a sectional view taken on the line I–I in FIG. 1 to illustrate the relation between the casing comprised of an upper and a lower body and the movable body disposed in the casing.
Figure 28:
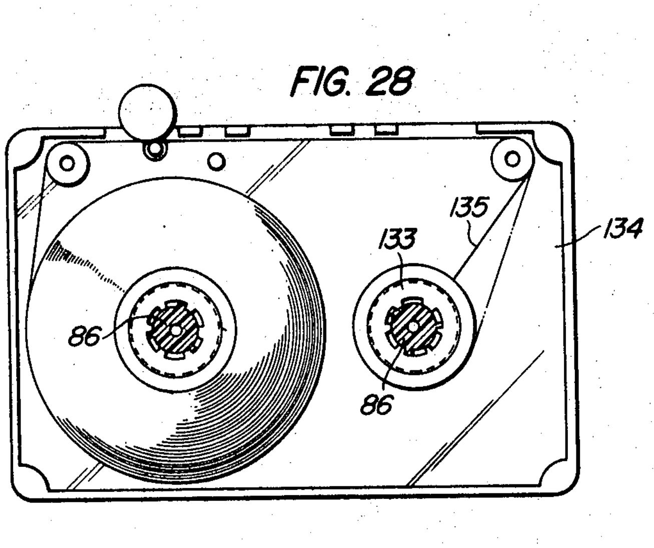
FIG. 28 is a plan view of the magazine for use with the apparatus according to the present invention.
Figure 29:
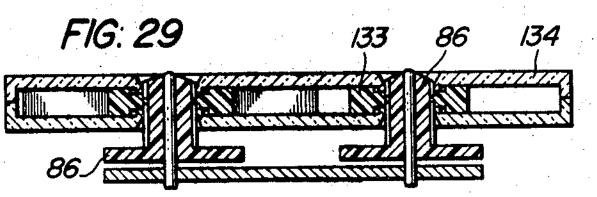
FIG. 29 is a sectional view taken on the line III—III in FIG. 28.

General structure of a tape recorder of the magazine type embodying the present invention will first be described with reference to FIGS. 1, 2 and 3. Briefly speaking, the tape recorder comprises a movable body 7, an upper body 41 and a lower body 57. The movable body 7 is provided with a drive motor 1, a capstan 5, reel shafts 86 and 87, and various means required for the fast forwarding and rewinding of a tape. The upper body 41 is provided with a magazine guide 54, a recording and reproducing head 44, an erasing head 45, a pair of elongated guide slots 83 in its opposite sidewalls for directly guiding one end of the movable body 7 in parallel with the direction of insertion of a magazine of a shape and structure as shown in FIGS. 28 and 29, and a pair of curved or arcuate slots 84 in the opposite sidewalls for arcuately guiding the other end of the movable body 7 so as to cause an upward movement of the movable body 7 about the first-mentioned end thereof. The lower body 57 is provided with a suitable number of push button means for causing the fast forwarding, rewinding and other operations required for the tape recorder.

The movable body 7 is slidably mounted within the upper body 41 by means of horizontally sliding pins 79 which extend through opposite sidewalls of an ejector 42 slidably supported on the upper body 41 and through the guide slots 83 in the opposite sidewalls of the upper body 41 into the movable body 7 adjacent to one end thereof, while the upward movement of the movable body 7 is effected by means of arcuately sliding pins 80 which are provided adjacent to the other end of the movable body 7 and are slidably received in the arcuate slots 84 in the opposite sidewalls of the upper body 41. The ejector 42 comprises a pair of abutments 42′ engageable with the leading end of the magazine inserted through the magazine guide 54, and a pair of connecting members 42″ for causing the desired magazine-actuated sliding movement of the movable body 7 as hereinafter described in detail.

Figure 5:
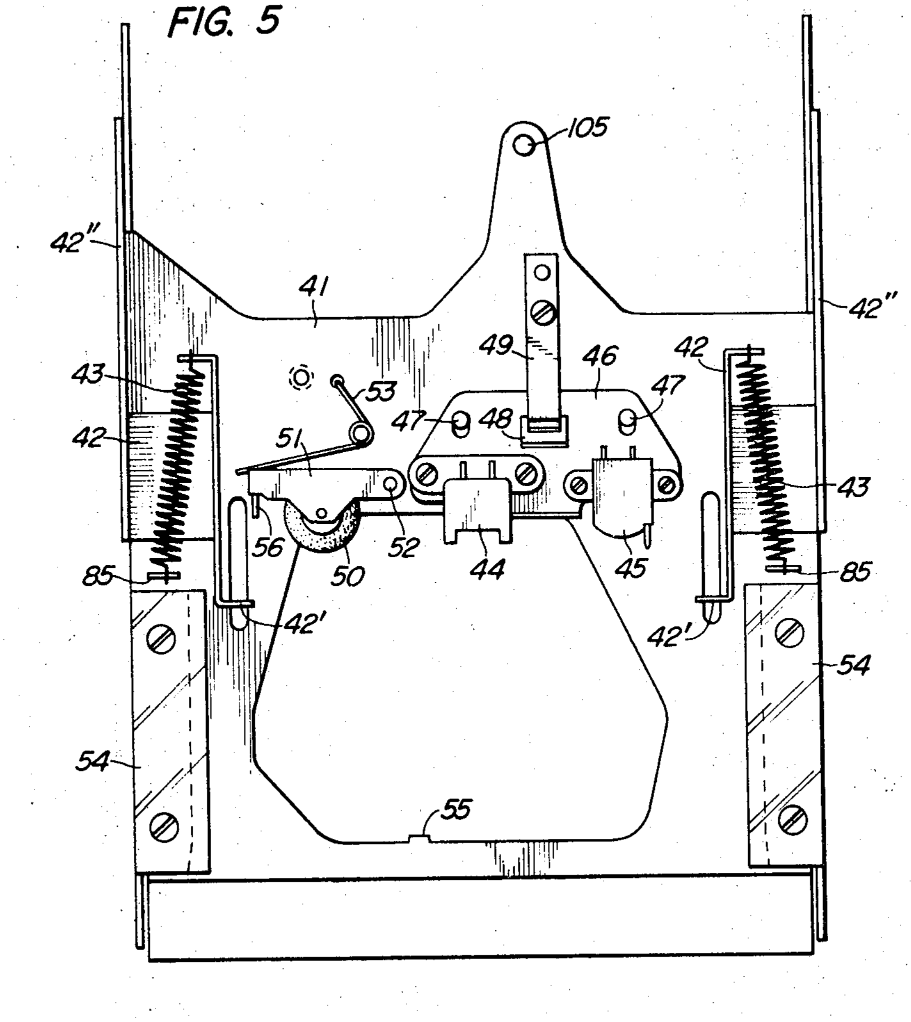
FIG. 5 is a plan view of the upper body in the nonoperating state of the apparatus.
Figure 6:
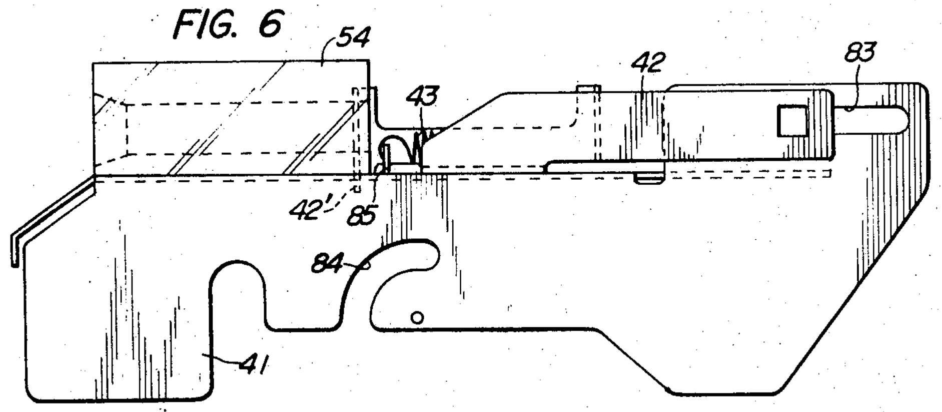
FIG. 6 is a side elevational view of the upper body shown in FIG. 5.

Referring to FIG. 5, a pinch roller arm 51 carrying a pinch roller 50 is pivotally mounted at one end thereof on a pinch roller arm shaft 52 and is normally pressed at its free end against a stopper 56 by a pinch roller spring 53. A head mounting member 46 mounting thereon the recording and reproducing head 44 and the erasing head 45 has a sloped portion 48 which is normally urged by a holding-down spring 49 so that the head mounting member 46 is normally urged forwardly by being guided by guide pins 47 as shown in FIG. 5. The magazine guide 54 for guiding the inserting and ejecting movement of the magazine is firmly secured to the upper body 41 to define a magazine insertion opening. A stop finger 55 for brake actuation is provided on a part of the upper body 41.

Figure 9:
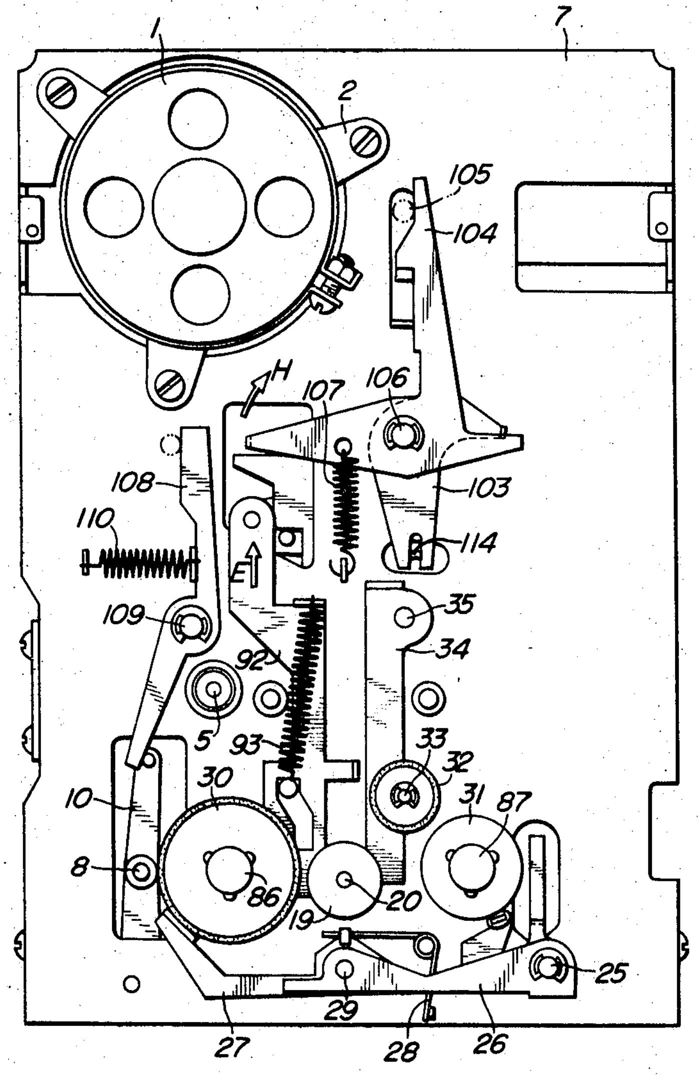
FIG. 9 is a plan view of the movable body in the nonoperating state of the apparatus.
Figure 10:
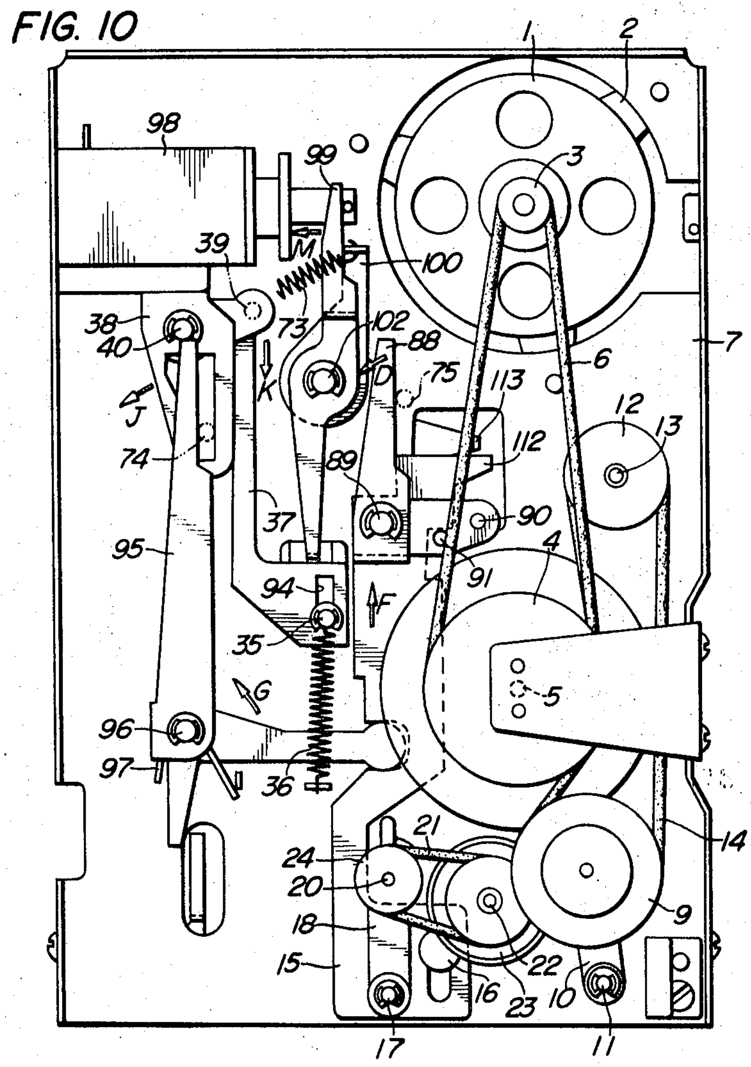
FIG. 10 is a back view of the movable body shown in FIG. 9.
Figure 11:
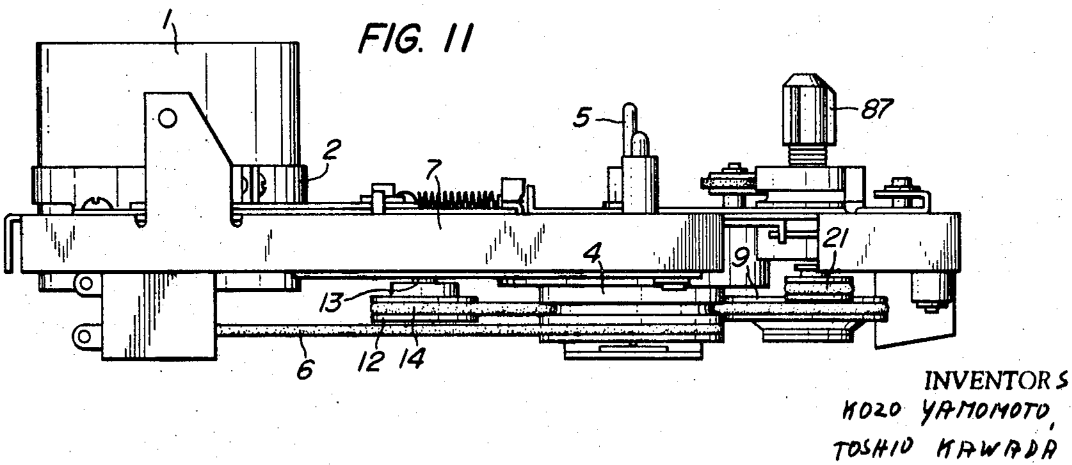
FIG. 11 is a side elevational view of the movable body shown in FIG. 9.

Referring to FIGS. 9 and 10, a motor mounting plate 2 firmly secures the motor 1 to the movable body 7. A motor pulley 3 is fixedly mounted on the shaft of the motor 1, and a flywheel belt 6 is trained around the motor pulley 3 and a flywheel 4 to which the capstan 5 is coaxially fixed for unitary rotation therewith. A takeup arm 10 is pivotally mounted at one end thereof on a takeup arm shaft 11, and a takeup roller 8 and a takeup pulley 9 are coaxially rotatably mounted on opposite faces of the takeup arm 10 at a position substantially middle of the length of the takeup arm 10. A takeup belt 14 is trained around a guide pulley 12 mounted on a guide pulley shaft 13 and the takeup pulley 9, with the belt 14 engaging the flywheel 4. A fast forwarding arm 18 is pivotally mounted at one end thereof on a fast forwarding arm shaft 17, and a forwarding roller 19 and a forwarding pulley 24 disposed on opposite faces of the free end of the fast forwarding arm 18 are coaxially mounted for rotation on a forwarding shaft 20. A fast forwarding belt 21 is trained around the forwarding pulley 24 and an idler 23 rotatably mounted on an idler shaft 22. A fast forwarding lever 88 which resembles a bellcrank is pivotally mounted on a fast forwarding lever shaft 89 and has one of its ends operatively connected by means of a pivot 90 to a slide lever 92, which is normally urged in one direction by a spring 93. A rewinding arm 38 is pivotally mounted on a rewinding arm shaft 40 and is operatively connected to a rewinding rod 37 by means of a rewinding rod pin 39. A rewinding roller lever 34 having a rewinding roller 32 rotatably mounted on a rewinding shaft 33 is provided at one end thereof with a rewinding lever pin 35 which is received in a slot 94 of the rewinding rod 37 so that the rewinding roller lever 34 is slidable along the slot 94 by being guided by the pin 35. The rewinding roller lever 34 is normally urged in one direction by a rewinding spring 36.

A release lever 95 is pivotally mounted on a release lever shaft 96 and is normally urged in one direction by a spring 97. A slide plate 15 carrying thereon the fast forwarding arm 18 and adapted to be guided by both a pin 16 and the fast forwarding lever shaft 89 is provided with cutouts which are engaged by a pin 91 provided on the fast forwarding lever 88 and a circular end portion of the release lever 95, respectively. A return lever 99 is pivotally mounted at one end thereof on a return lever shaft 102 and has the other or free end thereof engaged by a pin on a plunger 98. A return augmenting lever 100 is also pivotally mounted on the return lever shaft 102 in coaxial relation with the return lever 99. A fast forward and rewind position locking lever 103 and a play position locking lever 104 are coaxially pivotally mounted on a locking lever shaft 106 and are normally urged in one direction by a locking lever spring 107. A lever 108 engaging at one end thereof with the corresponding end of the takeup arm 10 to urge the latter in one direction is pivotally mounted on a shaft 109 and is normally urged in one direction by a spring 110. A takeup reel table 30 and a supply reel table 31 are rotatably mounted on the respective reel shafts 86 and 87 and are forcibly engaged by respective brake arms 27 which are urged by a brake spring 28. The brake arms 27 are operatively connected by a brake pin 29 to a brake shifter 26 pivotally mounted at one end thereof on a brake shaft 25.

Figure 7:
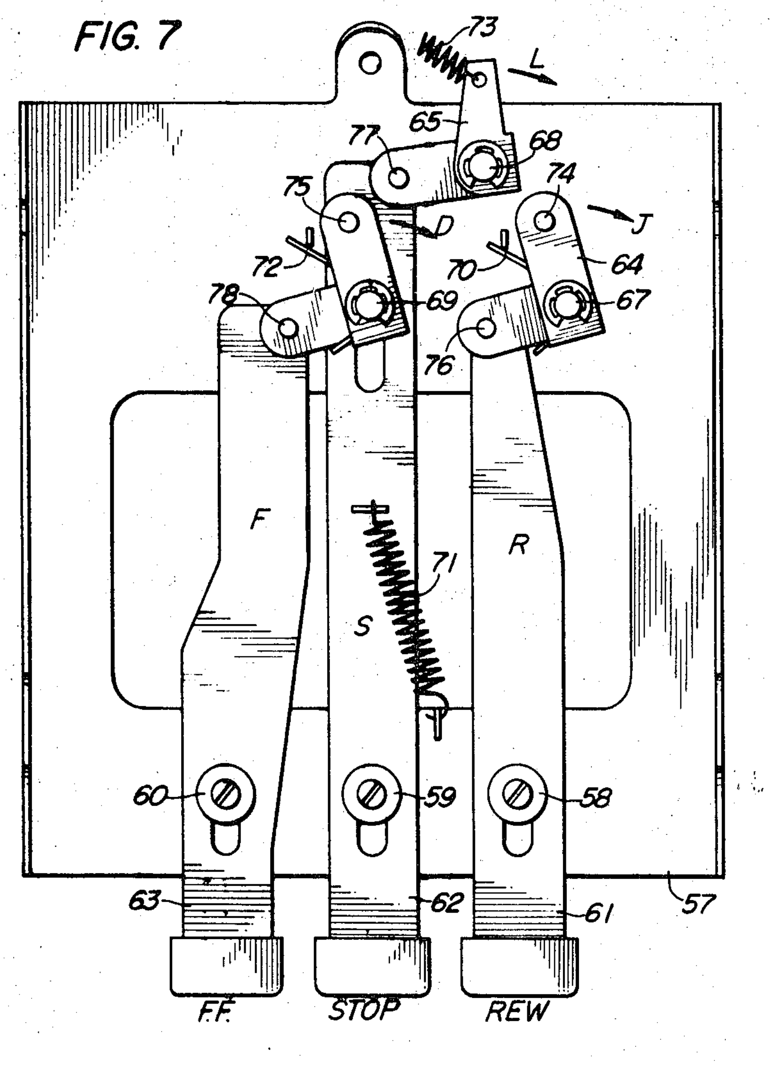
FIG. 7 is a plan view of the lower body in the nonoperating state of the apparatus.
Figure 8:
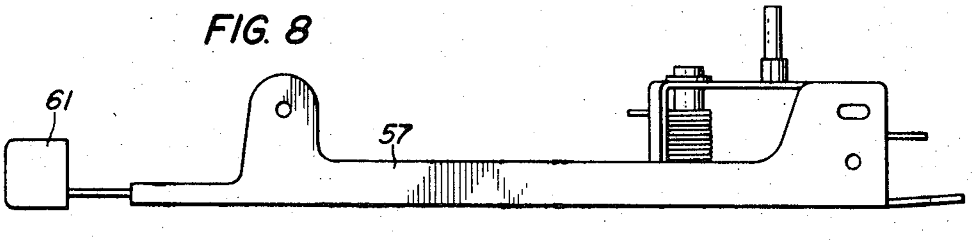
FIG. 8 is a side elevational view of the lower body shown in FIG. 7.

Referring to FIG. 7, a stop lever 62, a rewind lever 61 and a fast forward lever 63 are slidably carried by the lower body 57. The stop lever 62 is guided in its sliding movement by a lever holding pin 59 and a fast forwarding arm shaft 69 and is normally urged in one direction by a stop spring 71. A stop arm 65 pivotally mounted at one end thereof on a stop arm shaft 68 is operatively connected to one end of the stop lever 62 by a locking pin 77 and has the other or free end thereof connected to the return augmenting lever 100 by means of a release spring 73. The rewind lever 61 is guided in its sliding movement by a lever holding pin 58 and has one end thereof operatively connected by a pin 76 to a rewinding arm 64, which is pivotally mounted at one end thereof on a rewinding arm shaft 67 and is normally urged in one direction by a rewinding spring 70. The fast forward lever 63 is guided in its sliding movement by a lever holding pin 60 and has one end thereof operatively connected by a pin 78 to a fast forwarding arm 66, which is pivotally mounted at one end thereof on the fast forwarding shaft 69 and is normally urged in one direction by a fast forwarding spring 72.

The structure of the individual sections constituting the tape recorder embodying the present invention, that is, the movable body 7, the upper body 41 and the lower body 57 will be understood from the foregoing description. The overall structure of the integral assembly of these sections will now be described in detail.

Referring again to FIGS. 1 to 3, one end of the movable body 7 is integrally connected by the horizontally sliding pins 79 to one end of the ejector 42 slidably supported on the upper body 41 and is slidable along the elongated slots 83 in the opposite sidewalls of the upper body 41 by being guided by the sliding pins 79 received in the slots 83. Further, the other end of the movable body 7 is adapted to be guided by the arcuately sliding pins 80 which are provided on the movable body 7 and are engageable in the arcuate slots 84 in the opposite sidewalls of the upper body 41. The lower body 57 is integrally fastened to the lower part of the upper body 41 by a plurality of fastening screws 81. The upper body 41 is provided with a pair of projections 85, and an ejector spring 43 is anchored at one end to each of the projections 85 and at the other end to a corresponding upstanding portion of the ejector 42 in order to normally urge one end of the movable body 7 together with the ejector 42 in a direction as shown by the arrow A in FIG. 3. On the other hand, the other end of the movable body 7 is normally urged in a direction as shown by the arrow B due to the fact that the arcuately sliding pins 80 fixed to the movable body 7 are guided by the arcuate slots 84. Thus, the other or front end of the movable body 7 rests normally on the inner face of the lower body 57 by means of a support leg 82 fixed to the movable body 7. In this case, the takeup reel shaft 86, the supply reel shaft 87 and the capstan 5 are situated beneath the upper body 41 so that the front end portion of the movable body 7, which takes its lower position as shown in FIG. 3, may not interfere with the insertion of a magazine which may subsequently be inserted into the tape recorder by being guided by the magazine guide 54.

The practical operation of the tape recorder having the structure described above will now be described in detail with reference to FIGS. 1 to 3. The magazine adapted for use with the tape recorder embodying the present invention has the shape and structure shown in FIGS. 28 and 29. As the magazine is inserted into the tape recorder through the magazine guide 54, the leading end of the magazine is engaged by the abutments 42' of the ejector 42 and forces the ejector 42 in a direction as shown by the arrow C against the force of the ejector springs 43, With the movement of the ejector 42 in the above direction, the horizontally sliding pins 79 pivotally connecting one end of the movable body 7 to the connecting members 42'' of the ejector 42 are urged in the same direction in the elongated linear slots 83 of the upper body 41, and cooperate with the arcuately sliding pins 80 guided by the arcuate slots 84 of the upper body 41 to cause an upward movement of the front end of the movable body 7. As a result of the above movement of the movable body 7, the takeup reel shaft 86, supply reel shaft 87, capstan 5, pinch roller 50, recording and reproducing head 44 and erasing head 45 are brought into engagement with the corresponding elements in the magazine and the playable condition is thus established. Under the above state, the play position locking lever 104 on the movable body 7 is engaged by a stop pin 105 fixed to the upper body 41 and the movable body 7 is locked in a position as shown in FIG. 2. Then, when the fast forward lever 63 is manipulated under the above state of the movable body 7, a fast forwarding pin 75 secured to the free end of the fast forwarding arm 66 is urged in a direction as shown by the arrow D in FIG. 7, and the fast forwarding lever 88 engaged by the fast forwarding pin 75 is also urged in the same direction or in the direction shown by the arrow D in FIG. 10. As a result, the slide lever 92 connected to the fast forwarding lever 88 by the pivot 90 makes a sliding movement in a direction as shown by the arrow E in FIG. 9 so that the forwarding roller 19 is forced to engage the takeup reel table 30. At the same time, the sliding movement of the slide plate 15 in a direction as shown by the arrow F in FIG. 10 by being urged by the pin 91 forces the idler 23 into a driving engagement with the flywheel 4, and urges the release lever 95 in a direction as shown by the arrow G in FIG. 10, thereby urging the brake shifter 26 in a direction in which the brake force applied to the takeup reel table 30 and the supply reel table 31 is released. A lug 112 at the rear end of the slide plate 15 operates as described below in simultaneous relation with the above-described movement of the slide plate 15. More precisely, the lug 112 abuts a lug 113 on the play position locking lever 104 and urges the play position locking lever 104 to rotate in a direction as shown by the arrow H thereby disengaging the play position locking lever 104 from its locked position with the stop pin 105, with the result that the play position locking lever 104 is engaged by a stopper on the fast forward and rewind position locking lever 103 and is held in such a position. Because of the movement of the play position locking lever 104 in the manner described above, the magnetic tape in the magazine having been engaged by the pinch roller 50, the recording and reproducing head 44 and the erasing head 45 carried by the upper body 41 is disengaged from the latter while the takeup reel shaft 86 and the supply reel shaft 87 remain in their engaged position with the holes of the hubs in the magazine, and the magazine is thereby set at its intermediate position so that fast forwarding of the magnetic tape in the magazine can freely be carried out without interference by the recording and reproducing head and other elements of the tape recorder.

The rewinding mechanism can be actuated by manipulating the rewind lever 61. Manipulation of the rewind lever 61 causes movement of a rewinding pin 74 fixed to the free end of the rewinding arm 64 in a direction of arrow J in FIG. 7, which causes a corresponding movement of the rewinding arm 38 and the release lever 95 in the same direction or in the direction shown by the arrow J in FIG. 10. By the pivotal movement of the release lever 95, the slide plate 15 is urged in the direction of the arrow F to release the brake, to force the idler 23 against the flywheel 4 and to disengage the fast forward and rewind position locking lever 104 from its engaged position with the stop pin 105 to thereby bring the magazine to its intermediate position as described with reference to the operation for fast forwarding of the tape. Due to the movement of the rewinding arm 38 in the direction of the arrow J, the rewinding rod 37 connected to the rewinding arm 38 by the rewinding rod pin 39 is urged in the direction of the arrow K in FIG. 10, with the result that the rewinding roller lever 34 held in its rearward position by the rewinding rod 37 is released to move forwardly by the force of the rewinding spring 36, and the rewinding roller 32 is forced between the supply reel table 31 and the forwarding roller 19 to thereby set the magazine in a state in which the tape therein can freely be rewound.

The mechanism associated with the stop lever 62 operates in a manner as described below. When the stop lever 62 is manipulated while the magazine is placed in the operating state, the stop arm 65 connected to the stop lever 62 by the locking pin 77 is urged to rotate in the direction of the arrow L in FIG. 7, and the corresponding movement of the return augmenting lever 100 connected to the stop arm 65 by the release spring 73 causes the return lever 99 to rotate in the direction of the arrow M in FIG. 10. Since the front end of the fast forward and rewind position locking lever 103 is engaged by a lug 114 at the other end of the return lever 99, the above movement of the return lever 99 urges the fast forward and rewind position locking lever 103 to rotate in the direction of the arrow H in FIG. 9 thereby to disengage the play position locking lever 104 from its locked position by the stop pin 105 and to initiate a downward movement of the front end of the movable body 7. It will be apparent that the ejector 42 including the connecting members 42" and abutments 42' is also restored to its original position with the above movement of the movable body 7 to eject the magazine outwardly of the tape recorder along the magazine guide 54.

It will be understood from the foregoing description that an important feature of the present invention resides in the novel mechanism in which the movable body carrying reel shafts, capstan and drive means therefor is automatically moved upwardly about a pivot slidably received in the rear part of a casing as the connecting members are progressively urged rearwardly due to the insertion of a magazine so that the reel shafts and the capstan can be brought into driving engagement with the corresponding elements in the magazine. Another important feature of the present invention resides in the fact that the magazine thus placed in its operative position can be brought to an intermediate position by manipulation of a manipulating lever and can automatically be disengaged from its driving engagement with the drive means and ejected outwardly by manipulation of another manipulating lever.

The details of the operation including the insertion of a magazine, recording or reproduction, fast forwarding, rewinding and stopping have been explained in the above. In this respect, the apparatus which is adapted to cause the upward movement of the movable body 7 in response to the insertion of a magazine thereby to bring the drive means into driving engagement with the corresponding elements in the magazine may have a variety of forms. Some especially preferred embodiments of the apparatus will be described with reference to FIGS. 12 to 16.

Figure 12:
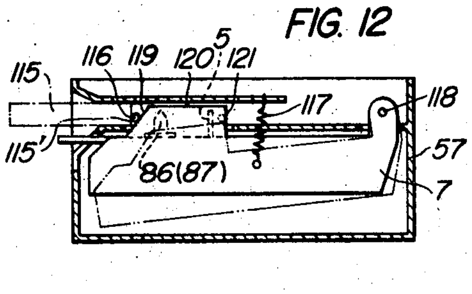
FIG. 12 is a partly sectional, schematic side elevational view of another embodiment of the apparatus according to the present invention, the apparatus being shown in a state before insertion of a magazine.
Figure 13:
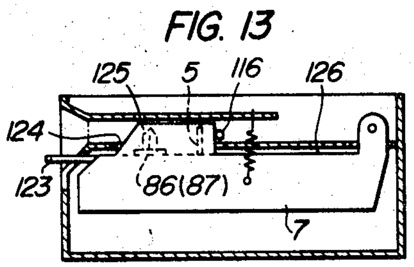
FIG. 13 is a view similar to FIG. 12, but showing a state after insertion of the magazine.

Referring to FIGS. 12 and 13, the apparatus includes a movable body 7 carrying thereon drive means including a capstan 5, a takeup reel shaft 86 and a supply reel shaft 87. The movable body 7 is pivotally mounted by means of a pivot 118 within an upper body 41 in such a manner that the axis of the pivot 118 lies in a plane passing substantially the center of the width of a magnetic tape contained in a magazine 115 when it is inserted to engage the drive means carried by the movable body 7. The movable body 7 is normally urged toward its upward position by a spring 117. A pair of upstanding frame portions 125 of a size which can loosely fit in an aperture 124 provided in the upper body 41 extend upwardly from opposite sides of the movable body 7 so that a sloped portion 119, a parallel portion 120 and a recess portion 126 are defined on the upper face of the movable body 7 by the upstanding frame portions 125.

A pin 116 is horizontally to-and-fro movably supported in the upper body 41, and an actuating knob 123 is fixed to the free end of the movable body 7 and extends outwardly through a slot in the upper body 41.

The apparatus having a structure as described above can be handled in the following manner. As the magazine 115 is inserted in a magazine guide 54 of the upper body 41 from the state shown in FIG. 12, the leading end 115' of the magazine 115 is abutted by the pin 116. As the magazine 115 is further pushed inwardly, the pin 116 makes a sliding movement on the sloped portion 119 of the movable body 7 by being urged by the leading end 115' of the magazine 115. Due to the fact that one end of the movable body 7 is pivotally supported by the pivot 118 and the pin 116 makes its horizontal sliding movement, the movable body 7 is urged downwardly about the pivot 118 against the force of the spring 117 to a position as shown by chain lines in FIG. 12. As the magazine 115 is further pushed inwardly, the pin 116 passes over the sloped portion 119 and slides along the parallel portion 120 until finally it is guided to the recess portion 126, at which position of the pin 116 the magazine 115 is positively set at a predetermined position in the apparatus. As soon as the pin 116 falls to rest on the recess portion 126, the movable body 7 is urged upwardly about the pivot 118 by the force of the spring 117 as shown in FIG. 13, and the drive means including the takeup reel shaft 86, the supply reel shaft 87 and the capstan 5 are brought into a predetermined relation with the corresponding elements in the magazine 115 and with the pinch roller as well as the magnetic head, thus the tape recorder being placed in its playable condition.

It will be understood from the above description that the present invention provides a novel mechanism which includes an upper body having a horizontally slidable pin disposed between the bottom wall and a magazine guide thereof and a movable body pivoted at one end and having its free end normally urged upwardly by a resilient means, the movable body being provided with a series of guide cam portions for guiding the horizontally slidable pin. By virtue of the above structure, the pin urges the movable body to swing downwardly as a magazine is inserted between the magazine guide and the bottom wall of the upper body, and when the magazine is brought to a predetermined position with respect to internal drive means including reel shafts, capstan, pinch roller and magnetic head, the movable body is automatically restored to its original upward position. Thus, mere insertion of the magazine can easily set the tape recorder in its playable condition. Another advantage is remarkable simplification of the structure of the tape recorder because there is utterly no need for the provision of a special mechanism. A further advantage of the above structure resides in the fact that out of alignment of the drive means, such as the reel shafts, with respect to the corresponding shaft receiving holes in the magazine in the transverse direction of the latter can be made almost negligible since the pivotal axis of the movable body lies in the plane passing substantially the center of the width of the tape contained in the magazine. In other words, since the drive means such as the reel shafts carried by the movable body make a substantially vertical movement during the upward movement of the movable body, out of registration in the relative positions of the drive means and the corresponding holes in the magazine does not take place, and the drive means can positively be held in their normal relation with the corresponding holes in the magazine. Another advantage of the present structure is the provision of a single actuating lever fixed to the movable body for unitary movement with the latter. Thus, the single actuating lever can switch over the tape recorder between its playable state, rewinding function and fast forwarding function, and the structure of the drive mechanism can thereby be simplified.

Figure 14:
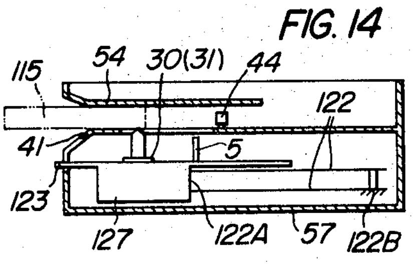
FIG. 14 is a partly sectional, schematic side elevational view of a further embodiment of the present invention, the apparatus being shown in the course of insertion of the magazine.
Figure 15:
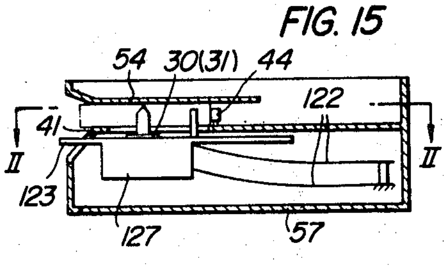
FIG. 15 is a view similar to FIG. 14, but showing a state after insertion of the magazine.
Figure 16:
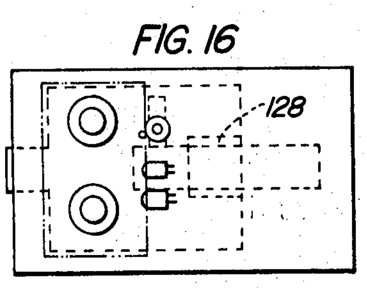
FIG. 16 is a partly cutaway plan view taken along the line II–II in FIG. 15.

Another form of the apparatus is illustrated in FIGS. 14, 15 and 16. The apparatus includes a movable body 127 which carries a takeup reel table 30, a supply reel table 31 and a capstan 5 on its upper face and is normally supported in its horizontal lower position by a parallel spring unit 122. The parallel spring unit 122 comprises two leaf springs parallelly disposed with each other and has one end 122A thereof fixed to the movable body 127 so as to normally urge the movable body 127 to its lower position, while the other end 122B of the parallel spring unit 122 is secured to a suitable portion of a lower body 57. An aperture 128 is bored through a portion of the lower body 57 in order to guide the movement of the parallel spring unit 122 resulting from the upward movement of the movable body 127 which is caused by the manipulation of an actuating knob 123 fixed to the free end of the movable body 127 and extending outwardly through a guide slot provided in the side face of an upper body 41.

The apparatus having a structure as described above can be handled in the following manner. In FIG. 14 the apparatus is shown in the state before insertion of a magazine 115. In the above state of the apparatus, the magazine 115 is inserted by being guided by a magazine guide 54 and the bottom wall of the upper body 41. In the state of complete insertion of the magazine 115, the actuating grip 123 may merely be urged upwardly against the force of the parallel spring unit 122 and suitably locked at a predetermined position. Mere manipulation of the actuating knob 123 in the manner described above causes an upward movement of the movable body 127 without the latter making any arcuate movement, and the reel shafts and the capstan carried by the movable body 127, the magazine 115, and the pinch roller as well as the magnetic head can be brought to predetermined positions relative to each other to establish a playable condition ready for starting the play. At the completion of the play, the actuating knob 123 may be released from its locked position to cause the downward movement of the movable body 127 by the action of the parallel spring unit 122 in parallel relation with the pinch roller and the magnetic head so as to place the tape recorder in its nonplayable state.

It will be understood that the present invention provides a tape recorder of the magazine type operable with a magazine adapted to be inserted at substantially right angles with respect to the axes of the reel shafts and capstan, in which a movable body carrying thereon the reel shafts and the capstan is supported between an upper body and a lower body by means of a parallel spring unit. The above structure is advantageous in that the reel shafts and the capstan carried by the movable body can be brought into driving engagement with the corresponding elements in the magazine by merely inserting the magazine into the tape recorder and then moving the movable body upwardly. The structure in which the movable body is arranged to be moved in vertically parallel relation by means of the parallel spring unit provides another advantage namely the drive means carried by the movable body can positively engage the corresponding elements in the magazine with strict precision in their dimensional relation and without any need for allowing margins, and a further advantage is derivable from the above arrangement in that the upper and lower bodies may be made quite thin in thickness and small-sized. The use of the parallel spring unit provides an advantage in that irregular rotation of the reels is eliminated to ensure good contact between the magnetic head and the tape thereby stabilizing the recorder output since external vibrations are absorbed by the parallel spring unit and are not transmitted to the movable body.

Figures 17A, 17B, 17C:
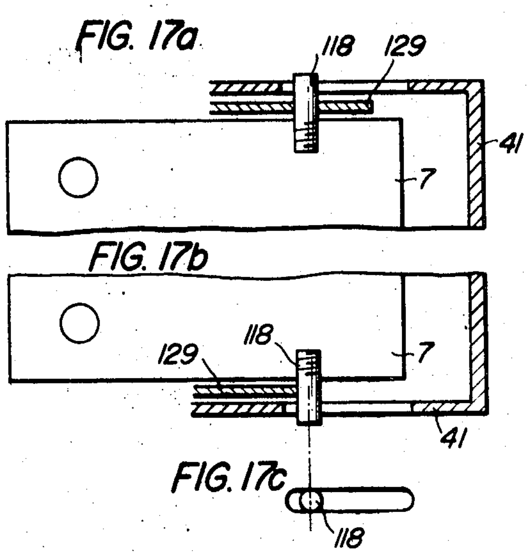
FIG. 17*a* is a schematic cross-sectional view showing one form of connection between the casing and the movable body by means of a pin and a connecting member.
FIG. 17*b* is a schematic cross-sectional view showing another form of connection between the casing and the movable body by means of a pin and a connecting member.
FIG. 17*c* is a schematic side elevational view showing the relation between the pin and an elongated slot in FIGS. 17*a* and 17*b*.

Referring to FIGS. 17*a* to FIG. 27, partial modifications in the interrelation between the movable body and the upper body will be described. In FIG. 17*a*, pins 118 having a threaded end are threaded into the movable body 7 at a portion adjacent to the rear end thereof and extend through a rear end portion of connecting members 129 into elongated linear slots adjacent to the rear end of the upper body 41 so as to cause a pivotal movement of the movable body 7 about the pins 118 in response to the magazine-actuated movement of the connecting members 129 which form the rearward extensions of the ejector 42.

In FIG. 17*b*, pins 118 similar to those shown in FIG. 17*a* are threaded into the movable body 7 and extend into elongated linear slots adjacent to the rear end of the upper body 41. In this case, the pins 118 do not extend through connecting members 129 but are adapted to be engaged by the rear ends of the connecting members 129 so that a rearward movement of the connecting members 129 can cause the pivotal movement of the movable body 7 about the pins 118. The relation between the pin 118 and the elongated slot is shown in FIG. 17*c*.

Figure 18:
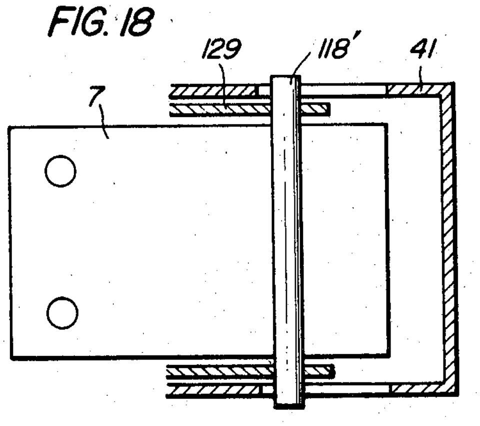
FIGS. 18 and 19 are schematic cross-sectional views showing other forms of connection between the casing and the movable body by means of a pin and a connecting member.
Figure 19:
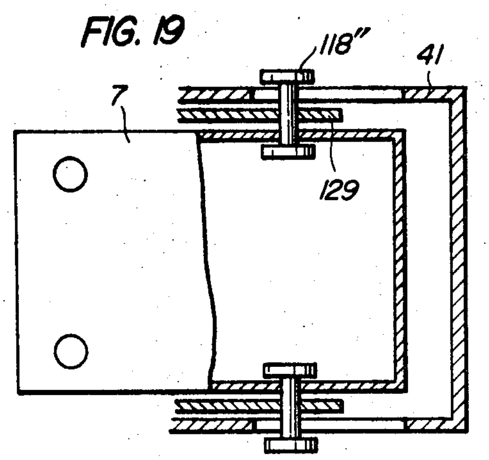

In FIG. 18, a single elongated pin 118' extends through the movable body 7 and connecting members 129 into elongated linear slots in the upper body 41, while in FIG. 19, two pins 118'' of I-like cross section are employed in lieu of the single pin 118' shown in FIG. 18.

Figure 20A:
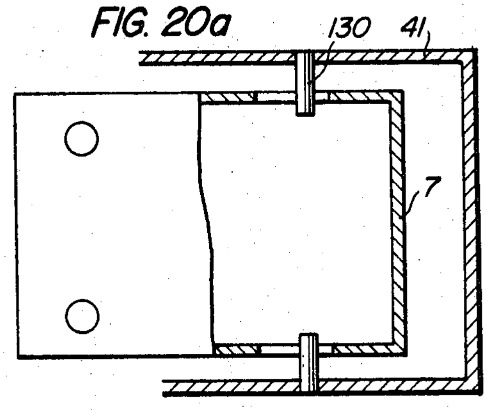
FIG. 20*a* is a schematic cross-sectional view showing a further form of connection between the casing and the movable body by means of a pin.
Figure 20B:
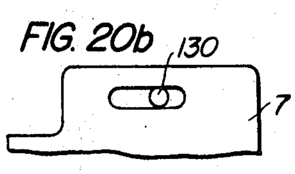
FIG. 20*b* is a schematic side elevational view showing the relation between the pin and an elongated slot in FIG. 20*a*.

In FIG. 20*a*, pins 130 fixed to opposite sidewall portions adjacent to the rear end of the upper body 41 extend inwardly into elongated linear slots provided in the sidewalls adjacent to the rear end of the movable body 7 so that, as the movable body 7 is urged rearwardly by the insertion of a magazine, the movable body 7 can make a pivotal movement about the pins 130. The relation between the pin 130 and the elongated slot in the movable body 7 is shown in FIG. 20*b*.

Figure 22:
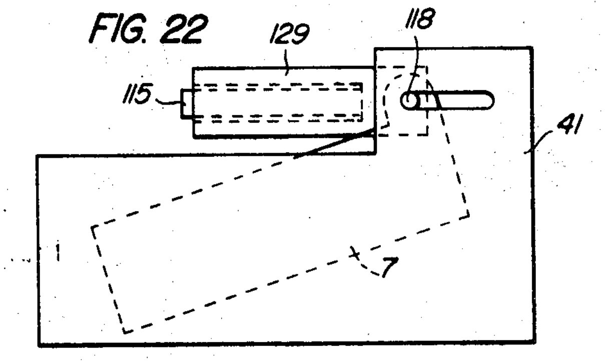
FIG. 22 is a partly sectional side elevational view of the apparatus shown in FIG. 21.
Figure 21:
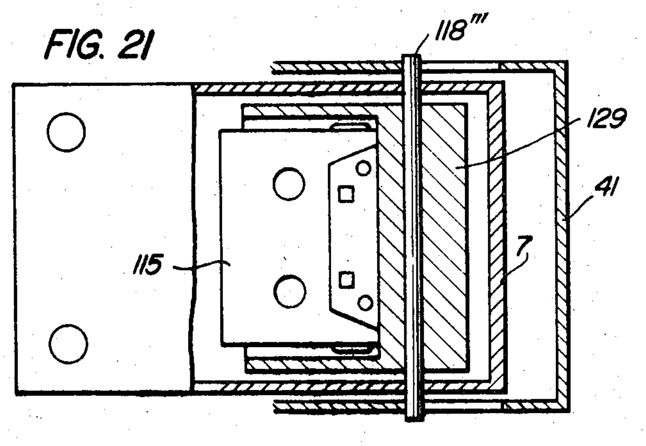
FIG. 21 is a schematic cross-sectional view showing the manner of connection between the casing and the movable body by means of a pin and a connecting member in another embodiment of the invention.
Figure 23:
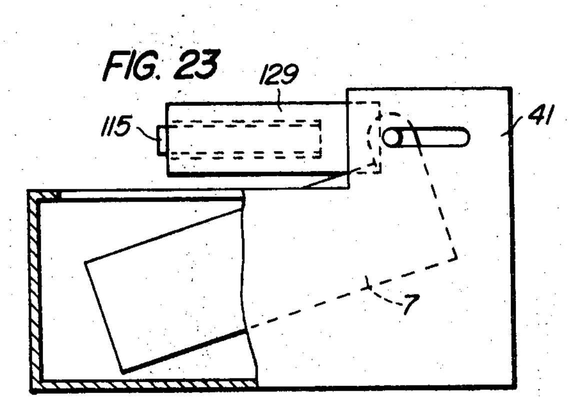
FIG. 23 is a partly sectional side elevational view showing a modification of the apparatus shown in FIGS. 21 and 22.

In FIGS. 21 and 22, the movable body 7 is pivotally connected by means of an elongated pin 118''' to a framelike connecting member 129 adapted to receive therein a magazine 115. The pin 118''' extending through the connecting member 129 and the movable body 7 is slidably received in elongated linear slots adjacent to the rear end of the upper body 41 so that, as the connecting member 129 is urged rearwardly, the movable body 7 can make pivotal movement about the pin 118'''. A modification of the above structure is shown in FIG. 23 in which the pin 118''' extending through the movable body 7 is adapted to be engaged by the connecting member 129 so as to likewise cause the pivotal movement of the movable body 7 about the pin 118''' as the connecting member 129 is urged rearwardly.

Figure 24:
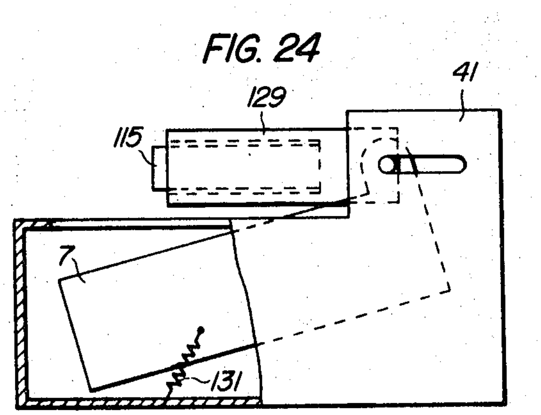
FIG. 24 is a partly sectional, schematic side elevational view of still another embodiment, the apparatus being shown in the course of insertion of a magazine.
Figure 25:
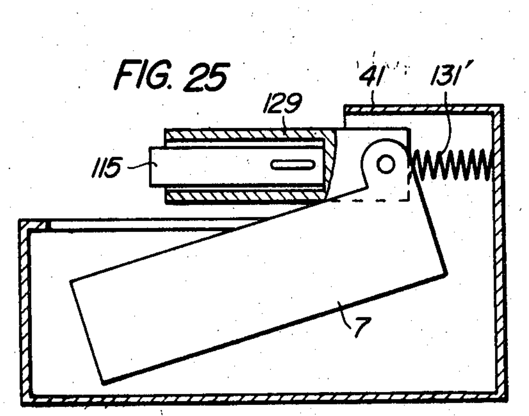
FIG. 25 is a partly sectional, schematic side elevational view of a further embodiment, the apparatus being also shown in the course of insertion of a magazine.

In FIG. 24, the movable body 7 is normally urged to its downward position by a spring 131 anchored to the bottom wall of the upper body 41. Other structures may be as shown in FIG. 22 or 23. In FIG. 25, the movable body 7 is normally urged to its downward position by a spring 131' anchored to the rear end wall of the upper body 41.

Figure 26A:
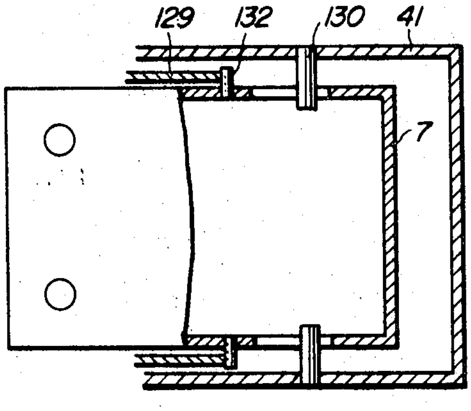
FIG. 26*a* is a partly sectional, schematic plan view of a still further embodiment to show the manner of connection between the casing and the movable body by means of a pin and a connecting member.
Figure 26B:
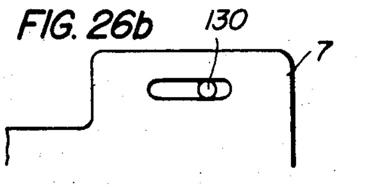
FIG. 26*b* is a side elevational view showing the relation between the pin and an elongated slot in FIG. 26*a*.

In FIG. 26*a*, pins 130 fixed to opposite sidewall portions adjacent to the rear end of the upper body 41 extend inwardly into elongated linear slots provided in the sidewalls adjacent to the rear end of the movable body 7, and pins 132 engageable with connecting members 129 extend outwardly from the movable body 7. In this structure too, the movable body 7 makes pivotal movement about the pins 130 as the connecting members 129 engage the pins 132 and urge the movable body 7 rearwardly. The relation between the pin 130 and the elongated slot in the movable body 7 is shown in FIG. 26*b*.

Figure 27:
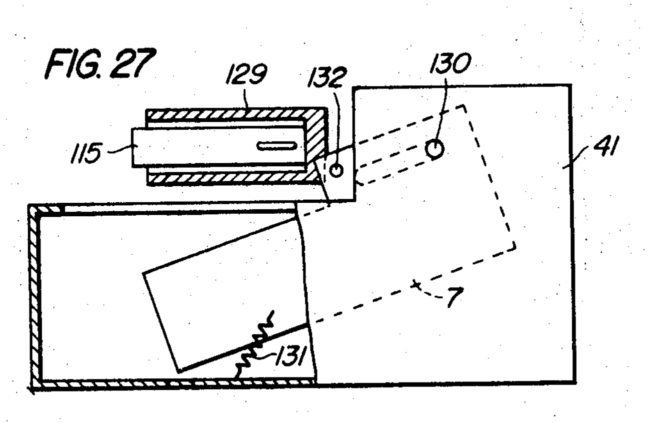
FIG. 27 is a partly sectional, schematic side elevational view of a yet further embodiment to show the manner of connection between the casing and the movable body by means of a pin and a connecting member.

In FIG. 27, the movable body 7 is normally urged downwardly by a spring 131 anchored to the bottom wall of the upper body 41, and a framelike connecting member engageable with pins 132 on the movable body 7 urges the movable body 7 to make a pivotal movement about pins 130 which are fixed to the upper body 41 and received in elongated linear slots in the movable body 7.

The shape and structure of the magazine preferably used with the tape recorder embodying the present invention will be briefly described with reference to FIGS. 28 and 29. The magazine comprises a generally rectangular casing 134 housing therein a pair of spaced rotatable hubs 133 having holes engageable with the reel shafts 86. In the casing 134, a magnetic tape 135 is trained around the rotatable hubs 133 with its opposite ends securely fixed to the outer periphery of the latter.

While some preferred embodiments of the present invention have been described here above by way of example, it will be understood that the present invention is in no way limited to these specific embodiments, and changes and modifications may be made therein without departing from the spirit of the invention.

We claim:

1. A tape recorder of the magazine type adapted to operate with a magazine of the kind equipped with two rotatable hubs for the supply and takeup of a magnetic tape enclosed therein, having a movable body provided with means for driving said tape in said magazine and movable between two extreme positions in response to insertion and withdrawal of said magazine into and out of said tape recorder, and a stationary casing movably supporting said movable body therein, said movable body carrying thereon a drive motor near a first end thereof, a capstan mounted in coaxial relation with a flywheel which is driven from said drive motor so as to drive said tape in said magazine, and reel shafts for causing rotation of said two hubs in said magazine, said casing carrying therein a magnetic head engageable with said tape in said magazine and a pinch roller for holding said tape between it and said capstan on said movable body so as to drive said tape in cooperation with said capstan; said tape recorder comprising means for pivotally and linearly movably supporting said first end, which is remote from the side carrying said reel shafts, of said movable body in one end of said casing so that said movable body can make a linear movement at said first end in the moving direction of said magazine while making a pivotal movement about said first end with respect to said casing, and means operative in response to the insertion of said magazine through a magazine insertion opening to cause said reel shaft side of said movable body to move toward the major face of said magazine as said magazine is progressively inserted thereby establishing a driving engagement between said reel shafts and said capstan on said movable body and the corresponding elements in said magazine.

2. A tape recorder of the magazine type according to claim 1, said means for pivotally and linearly movably supporting said first end comprising a pin provided adjacent to said first end which is remote from said reel shaft side of said movable body, and an elongated slot provided adjacent to said one end of said casing for guiding the movement of said pin.

3. A tape recorder of the magazine type according to claim 1, said means for pivotally and linearly movably supporting said first end comprising a pin provided adjacent to said one end of said casing, and an elongated slot provided adjacent to said first end which is remote from said reel shaft side of said movable body for guiding the movement of said pin.

4. A tape recorder of the magazine type according to claim 1, comprising means including a connecting member whose one end is engageable or connected with said supporting means and which is movable in the moving direction of said magazine with the insertion of said magazine, means for normally urging the reel shaft side of said movable body away from the major face of said magazine, means operative in response to the insertion of said magazine through a magazine insertion opening to cause said reel shaft side of said movable body to move toward the major face of said magazine as said magazine is progressively inserted thereby establishing a driving engagement between said reel shafts and said capstan on said movable body and the corresponding elements in said magazine, and magazine ejection means for ejecting said magazine by causing said movable body to move away from the major face of said magazine and thereby causing said connecting member to move toward said magazine insertion opening.

5. A tape recorder of the magazine type according to claim 4, said means for pivotally and linearly movably supporting said first end comprising a pin provided adjacent to said first end which is remote from said reel shaft side of said movable body, and an elongated slot provided adjacent to said one end of said casing for guiding the movement of said pin.

6. A tape recorder of the magazine type according to claim 4, said means for pivotally and linearly movably supporting said first end comprising a pin provided adjacent to said one end of said casing, and an elongated slot provided adjacent to said first end which is remote from said reel shaft side of said movable body for guiding the movement of said pin.

7. A tape recorder of the magazine type according to claim 2, comprising means including a connecting member whose one end is engageable or connected with said pin and which is movable in the moving direction of said magazine with the insertion of said magazine, spring means connecting between a portion of said movable body adjacent to said pin and the magazine insertion opening side of said casing, and means operative in response to insertion of said magazine through the magazine insertion opening to cause said reel shaft side of said movable body to move toward the major face of said magazine as said magazine is progressively inserted thereby establishing driving engagement between said reel shafts and said capstan on said movable body and the corresponding elements in said magazine.

8. A tape recorder of the magazine type according to claim 3, comprising means including a connecting member whose one end is engageable or connected with said pin and which is movable in the moving direction of said magazine with the insertion of said magazine, spring means connecting between a portion of said movable body adjacent to said pin provided on said casing and the magazine insertion opening side of said casing, and means operative in response to the insertion of said magazine through the magazine insertion opening to cause said reel shaft side of said movable body to move toward the major face of said magazine as said magazine is progressively inserted thereby establishing a driving engagement between said reel shafts and said capstan on said movable body and the corresponding elements in said magazine.

9. A tape recorder of the magazine type according to claim 2, comprising means including a connecting member whose one end is engageable or connected with said pin and which is movable in the moving direction of said magazine with the insertion of said magazine, spring means connecting between said connecting member and said casing, and means operative in response to the insertion of said magazine through the magazine insertion opening to cause said reel shaft side of said movable body to move toward the major face of said magazine as said magazine is progressively inserted thereby establishing a driving engagement between said reel shafts and said capstan on said movable body and the corresponding elements in said magazine.

10. A tape recorder of the magazine type according to claim 3, comprising means including a connecting member whose one end is engageable or connected with said pin and which is movable in the moving direction of said magazine with the insertion of said magazine, spring means connecting between said connecting member and said casing, and means operative in response to the insertion of said magazine through the magazine insertion opening to cause said reel shaft side of said movable body to move toward the major face of said magazine as said magazine is progressively inserted thereby establishing a driving engagement between said reel shafts and said capstan on said movable body and the corresponding elements in said magazine.

11. A tape recorder of the magazine type according to claim 1, comprising a pin provided on said movable body adjacent to the end near said reel shafts, and an arcuate slot provided in said casing for guiding the movement of said pin.

12. A tape recorder of the magazine type according to claim 1, comprising a pin provided on said casing adjacent to said one end thereof, and an arcuate slot provided in said movable body adjacent to said first end remote from the reel shaft side thereof for guiding the movement of said pin.

13. A tape recorder of the magazine type according to claim 1, said means for pivotally and linearly movably supporting said first end comprising a pivot point disposed in a plane passing substantially the center of the width of said tape contained in said magazine, and means for operatively connecting said first end of said movable body with said one end of said casing at the position of said pivot point.

14. A tape recorder of the magazine type adapted to operate with a magazine of the kind equipped with two rotatable hubs for the supply and takeup of a magnetic tape enclosed therein, having a movable body provided with means for driving said tape in said magazine and movable between two extreme positions in response to the insertion and withdrawal of said magazine into and out of said tape recorder, and a stationary casing movably supporting said movable body therein, said movable body carrying thereon a drive motor, a capstan mounted in coaxial relation with a flywheel which is driven from said drive motor so as to drive said tape in said magazine, and reel shafts for causing rotation of said two hubs in said magazine, said casing carrying therein a magnetic head engageable with said tape in said magazine and a pinch roller for holding said tape between it and said capstan so as to drive said tape in cooperation with said capstan; said tape recorder comprising parallel spring means for vertically movably supporting said movable body in said casing, and means operative in response to the insertion and withdrawal of said magazine to cause a vertical movement of said movable body carried by said parallel spring means thereby establishing a driving engagement between said reel shafts and said capstan on said movable body and the corresponding elements in said magazine and releasing the driving engagement therebetween.

15. A tape recorder of the magazine type adapted to operate with a magazine of the kind equipped with two rotatable hubs for the supply and takeup of a magnetic tape enclosed therein, having a movable body provided with means for driving said tape in said magazine and movable between two extreme positions in response to the insertion and withdrawal of said magazine into and out of said tape recorder, and a stationary casing swingably supporting therein said movable body which is pivotal about a first end thereof with respect to said casing, said movable body carrying thereon a drive motor near said first end, a capstan mounted in coaxial relation with a flywheel which is driven from said drive motor so as to drive said tape in said magazine, and reel shafts for causing rotation of said two hubs in said magazine, said casing carrying therein a magnetic head engageable with said tape in said magazine and a pinch roller for holding said tape between it and said capstan on said movable body so as to drive said tape in cooperation with said capstan; said tape recorder comprising a roller member arranged to be engaged by one end of said magazine and urged to move within said casing along a plane including the major face of said magazine, spring means connecting between the free end of said movable body and a portion of said casing so as to normally urge said movable body toward the major face of said magazine, and a guide portion formed on said movable body so as to guide the movement of said rolling member over said movable body, whereby said movable body is once urged away from the major face of said magazine by the progressive movement of said rolling member resulting from the insertion of said magazine and is then restored to the original position when said magazine comes to a predetermined position so that said reel shafts and said capstan on said movable body can be brought into driving engagement with the corresponding elements in said magazine.

16. A tape recorder of the magazine type according to claim 15, in which said guide portion is in the form of a cam adapted to cause the above movement of said movable body.